May 13, 1947. J. RABINOW 2,420,339
COURSE-RECORDING CAMERA
Filed Aug. 22, 1944 2 Sheets-Sheet 1
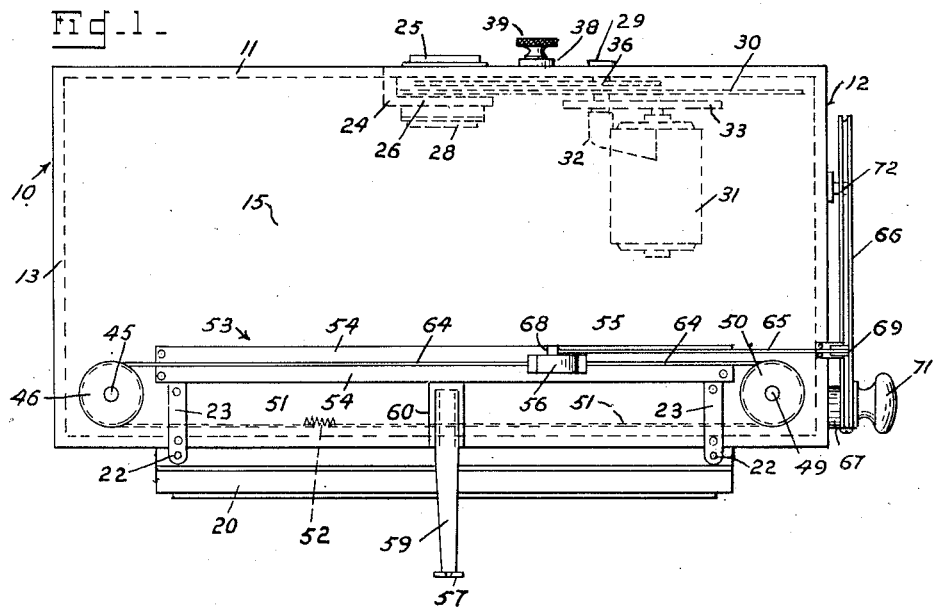
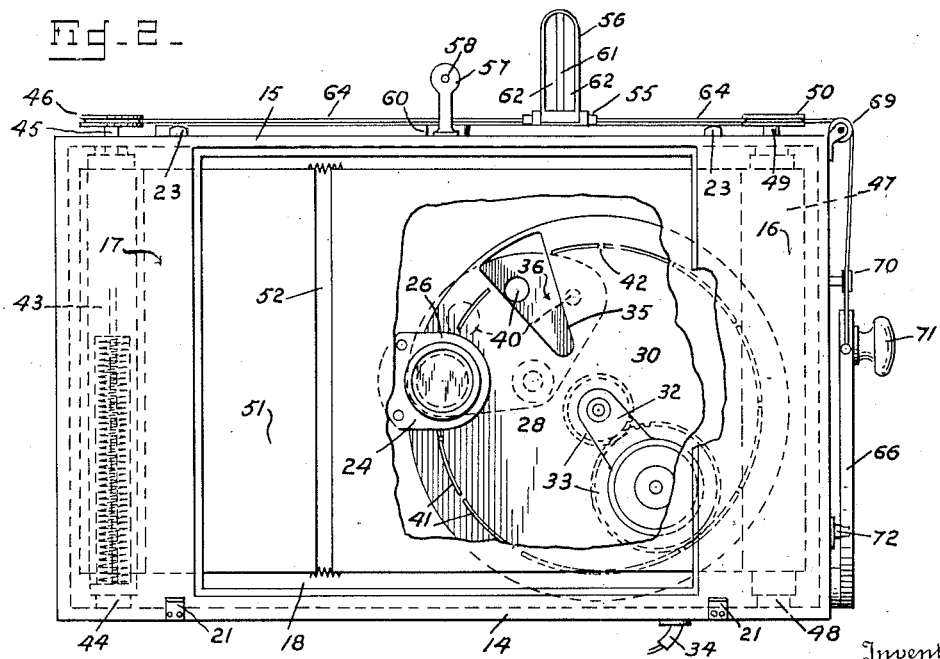
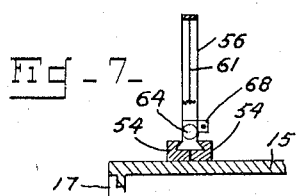
Inventor
Jacob Rabinow
By C. E. Herrstrom & H. E. Thibodeau
Attorneys May 13, 1947.  J. RABINOW  2,420,339
COURSE-RECORDING CAMERA
Filed Aug. 22, 1944  2 Sheets-Sheet 2
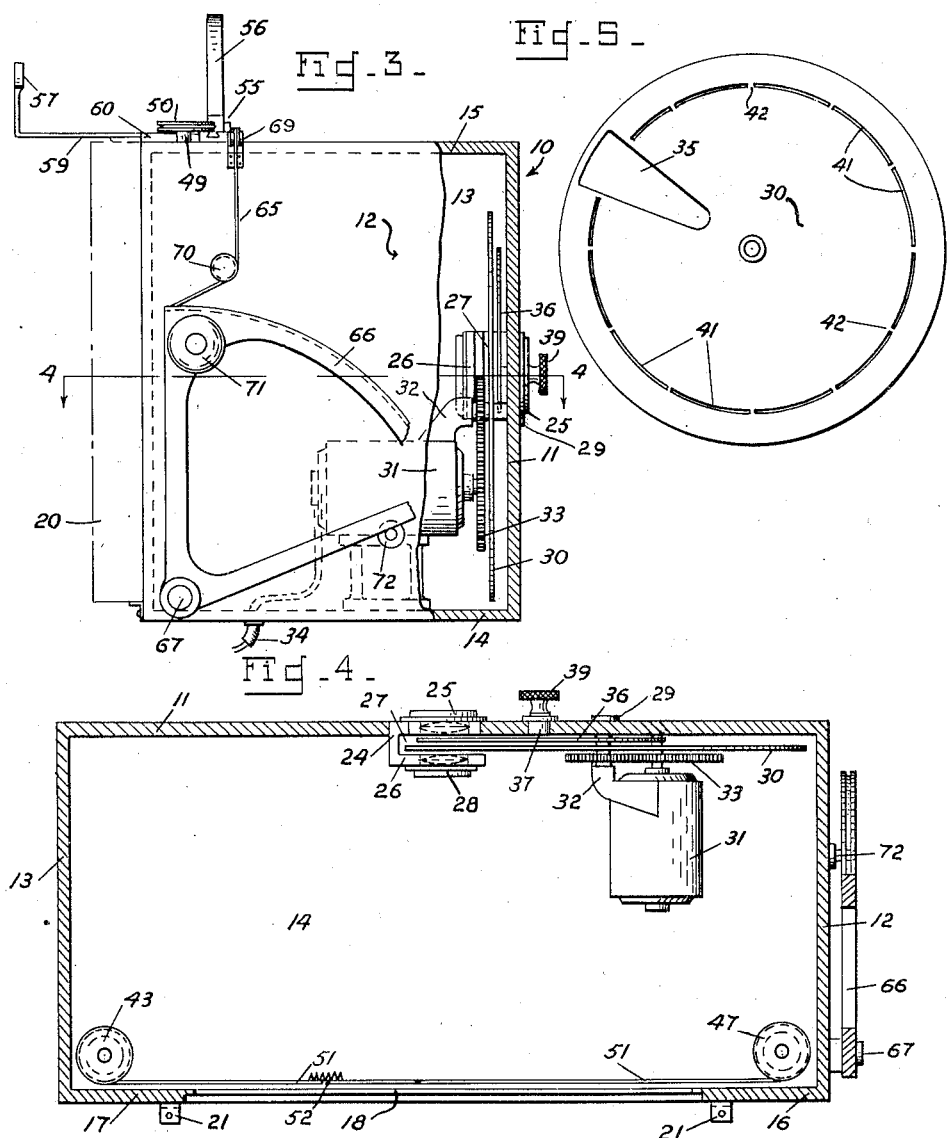
Inventor
Jacob Rabinow Patented May 13, 1947

2,420,339

UNITED STATES PATENT OFFICE 2,420,339

COURSE-RECORDING CAMERA

Jacob Rabinow, Washington, D. C., assignor to United States of America, as represented by the Secretary of War and his successors in office Application August 22, 1944, Serial No. 550,654

7 Claims. (Cl. 95—36)

(Granted under the act of March 3, 1883, as amended April 30, 1928; 370 O. G. 757)

The invention described herein may be manufactured and used by or for the Government for governmental purposes, without the payment to me of any royalty thereon.

The invention relates to method and means for making photographs of moving objects and particularly to producing a graph-like record of the progress of an object. It is particularly adapted to produce such a record of a rapidly moving object, but is applicable at will to objects moving at various speeds, without change of construction, ordinarily.

It is an important object of the invention to avoid the requirement of making a separate negative plate or film of each exposure in a series made of the course of a moving object, but to enable the use of single plate or film bearing the light sensitive photographic emulsion, so that a complete picture may be made upon which the course of the object is shown in relation to the actual horizon or a base line of known length in a vertical plane approximately common with the course of the object photographed.

It is an important aim to enable the indication in such picture of the flight time components at various parts of the course of the object, so that these may be read on the photograph without coordination computations relating to different exposures, and in many cases without requiring any computation whatever.

An important further purpose is to present a method of recording the movement of an object, and especially such as an airplane in flight, or a projectile in flight, and in such manner that the entire flight of the object may be depicted, so as to present exactly its trajectory and positions of the projectile at uniform time intervals during its flight. This applies correspondingly to recording movements of vehicles on land or ships afloat, baseball, bird flight, etc.

A still further important attainment sought is to enable the presentation of such a picture in which a non-intermittent record is incorporated so that at the same time that detail photographs of an object at intervals in its flight are presented, a continuous graph or curve is inscribed by the object itself upon the record made.

A valuable attainment of the invention lies in a method whereby a camera set up with a sensitized plate or other surface positioned to receive the whole field of refracted rays from the lens if exposed with a conventional shutter, may be operated so that only that part of the emulsion is exposed that is adjacent the image of the moving object at any instant during the course of its recording, and so that successive full exposures of the object, having full pictorial value, will be made at uniform time intervals, on these areas of the emulsion, as the object progresses on its course.

One of the most important objects of my invention is to enable the production of a camera accomplishing the above stated objects, in an extremely simple construction readily producible without excessive complications in production practice and involving few special forms.

It is a further advantage that mechanism is reduced to a minimum, since simple plates or cut film sheets may be used as the emulsion support, simplifying both loading and dark room procedure. In the specification and claims the term "film" will be used as inclusive of either plates, conventional film, or other support, with the necessary emulsion, or other sensitive surface forms available, or which may become available, the emulsion at present being regarded as the essential film.

Additional objects, advantages and features of invention reside in the construction, arrangement and combination of parts involved in the embodiment of the invention, as will appear or be understood from the following description and accompanying drawings wherein:

Fig. 1 is a top view of a camera embodying my invention;

Fig. 2 is a rear view thereof with the plate-holder mounting section or back removed;

Fig. 3 is a right side view thereof, partly in section;

Fig. 4 is a horizontal section of the camera on the line 4—4 of Fig. 3;

Fig. 5 is a detail elevation of the shutter;

Fig. 6 is a formal representation of a graph produced with my camera.

Fig. 7 is a cross section of the stadia guide.

Referring to the drawings, there is shown a camera comprising a rectangular box 10 slightly elongated transversely, having a front wall 11, right and left side walls 12 and 13, a bottom or floor 14 and a top wall 15. Right and left short walls 16 and 17 are provided at the rear extending from bottom to top and joined to the respective adjacent end walls. There is thus left in the rear of the box a square opening 18 bounded by the walls 15, 16, 17, and the floor 14. The edges of the box around the opening are rabbeted to receive the usual projected face of a conventional removable back 20 constituting a ground glass holder and releasable holding means for a plate or film-holder. The details of this removable back are not disclosed here as it is a commercial article of general use and well known construction. At the bottom of the opening, small L bracket plates 21 are provided on the rear face of the box to receive the usual fixed pins 22 of removable back, to hold the lower part of the latter to the box; and above the opening, spring tongues 23, are mounted on the top wall 15 projecting rearward in alinement with the brackets 21. In the present instance the size of the film contemplated is eight by ten inches, with a lens of approximately eight inch focus.

In the front wall 11 an opening is formed in which there is mounted a lens plate 24 in which there is mounted the front combination 25 of a conventional photographic objective, and the plate has an integral inner plate 26 of similar form but connected to the plate 25 only at one side, and spaced from the latter so as to afford a shutter slot 27 between the two. The rear combination 28 of the objective lens is mounted on the plate 26. At a distance horizontally from the lens a shutter bracket 29 is mounted on the front wall of the box, on which there is mounted a revoluble disc shutter 30 having its shaft revoluble in the bracket, the disc being disposed in the slot 27 across and beyond the path of light admitted through the front lenses.

An electric or other variable speed motor 31 is mounted on the floor 14 in one end of the box, from the case of which a rigid bracket arm 32 is extended across the axis of the shutter and supporting the inner end of the shutter shaft. Conventional gearing 33 is connected between the motor shaft and shutter shaft.

The motor may be energized from any suitable electrical source through conventional lead-in connections 34 of such length as may be required.

The shutter 30 in the present instance consists of a simple disc of metal suitably blackened and is formed at one part with a radial slot or bight part 35 of a width appropriate to the illuminating value or "speed" of the lens and the intervals at which the successive full exposures are to be made. In one embodiment, the width of the part of the slot which passes between the lenses has been approximately equal to the diameter of the maximum aperture of the lens.

For controlling the degree of illumination, a diaphragm 36 is mounted revolubly on a short shaft 37 carried in a bushing 38 set in the front wall 11 and provided with a knob 39 fixed thereon without the box, by which the diaphragm may be rotated. The diaphragm is provided with the usual apertures 40 by which the illumination and definition of the image on the film is controlled.

The shutter disc 30 has formed therein a concentric annular series of curved slots 41, the slots being separated by very small intervals, the material 42 therebetween being of a circumferential dimension which is a small fraction of the diameter of the lenses of the objective and being in sufficient number to form a good structural connection between the portions of the disc inward and outward of the slots. The slots are also of small radial dimension in comparison to the diameter of the lens. For instance, when used with a lens of approximately eight inches principal focus and having a maximum working aperture of f. 4.5 the width of the slots measured radially has been about one-eighth inch, and the circumferential interval between the slots has had a similar extent. The slot series crosses the axis of the lens 25—28.

In the present instance the lens requires little if any fine adjustment of focus on the film to be exposed since for photographing objects such as land vehicles, airplanes or projectiles, the distance of the object from the camera will be from 100 feet or more to several thousand feet, and the focus may be adjusted for infinity. Some focal correction may be effected by screwing the lens in or out in its mounting, and other conventional focusing means may be utilized, as found expedient.

At the left end of the box, close behind the short wall 17, a conventional vertical spring roller 43 is mounted, having its spring-attached trunnion keyed to the floor bracket 44 in which the roller is pivoted at its lower end. The construction of such rollers being well understood and commercially available in various sizes, it is not illustrated in detail. This roller is provided at its upper end with a stud shaft 45 extended through the top wall 15 of the box, and fixed thereon is a flat-grooved pulley 46 close over the top surface of the box.

At the opposite end of the box a vertical roller 47 of similar dimensions is mounted close behind the short wall 16, being simply trunnioned in a floor bracket 48 and having a shaft 49 fixed on its upper end, extended through the top wall, and with a pulley 50 fixed thereon of the same size and in a plane with the pulley 46.

A screen or curtain shutter 51 is provided, of a length approximating twice the distance between the two rollers and the height somewhat less than the height of the opening 18, lapping the vertical edges of the latter. Its ends are attached to the respective rollers, and the spring of the roller 43 is normally under tension to hold the right hand half portion of the curtain extended to or near the left hand roller, through connections to be described. A slot 52 is formed in the curtain, extending its full height and of a horizontal width appropriate to the image size of the moving object to be photographed. This width may be several times the corresponding dimension of the said object image in some circumstances, if desired. This slot is so located in the curtain that when the curtain is wound to a desired limit on the roller 47, the slot is beyond the right hand boundary of the opening 18 and the cone of refracted rays from the lens to the film.

Mounted on the top of the camera there is a rectilinear stadia guide or track 53 consisting of two parallel plates 54 with opposed edges shaped and spaced apart to form a dove tail guide slot 53' and mounted on this track slidably, there is a stadia carriage 55, which is a block having a dove tail in the slot and of sufficient length to slide readily between the plates 54. In this there is erected an open stadia frame, finder, or tracker 56 arranged in a vertical plane parallel to the plane of the film when the latter is in place. This frame has rectilinear side legs defining an opening wider than the slot 52 in the curtain and of a height sufficient to subtend a vertical angle of rays passing to the eye piece equal to a substantial part of, if not the total, vertical angle at the focal plane of the lens subtended by the film. The width of the frame 56 may be a multiple of the width of the slot 52, or may have a definite relation to the horizontal angle of the cone of refracted rays subtended by the slot 52.

An eye piece 57 is provided fixed to the rear of the camera and above the level of the top of the camera approximating, or less than, half the height of the opening in the stadia frame 55.

The eye piece is a vertical circular disc or plate having a sight aperture 58 therethrough and provided with a rigid mounting arm 59 having a broadened flat horizontal base with parallel edges engaged to a limited distance slidably in a correspondingly channelled mount plate 60 secured to the top of the camera. The arm is slidably mountable and demountable manually and when mounted extends rearwardly of the camera normal to the focal plane of the lens, and to a distance from the path of the stadia device coordinated with the distance between the lens and curtain and the relative diameters of the rollers and pulleys. In the present instance, the distance between the eye piece and stadia path, being substantially less than the spacing of the curtain and lens center, the pulleys 46 and 50 are of correspondingly smaller diameter than the rollers.

If desired, however, the arm 59 may be lengthened so that the distance from the eye piece 57 to the path of the stadia or finder device is equal to or slightly greater than the curtain and lens spacing and the pulleys 46 and 50 made of the same diameter as the rollers 43 and 47.

The frame 56 has fixed in its opening two parallel stadia wires 61 spaced from each other a distance to subtend an angle having its vertex at the aperture 58 which angle approximates or is slightly less than the corresponding angle of the pencil or bundle of rays from the lens subtended by the slot 52 of the curtain. The frame is wide enough to also afford spaces 62 laterally of each of the wires, between the latter and the side legs of the stadia frame. This frame may be pivoted on the carriage 55 as shown so that it may be folded down close to the top of the camera, and swing upward to erect position as in Figs. 1 and 2 and 3. Taut metal ribbons or bands 64 are connected between the carriage 55 at respective sides and respective pulleys 46 and 50 so as to pass onto the pulleys at the front sides thereof. The curtain extends to the rear sides of the rollers 43 and 47, so that when the stadia carriage is moved, the curtain moves in an opposite direction.

The stadia device is moved by some means, so that when the camera is set up and focussed upon the expected course of the moving object, it may be kept in a line of sight from the eye-piece to the object to be photographed. The means for moving the stadia may be various and may include some well known azimuth sighting device such as a gun mount operated by a soldier who will maintain the object to be photographed in the sights of the gun, and a simple coordinated draft member or cable 65 extended from the stadia carriage to an element on the gun having the required and limited extend of movement when the gun is traversed over the angle covered by the field of view of the camera lens. The camera in such case would be stationary on the gun carriage or set up at a short distance from the gun not too great for parallax variances to impair registry of the curtain slot with the image of the object in the camera. The stadia device on the camera would then serve as a check to determine when proper connections are made, and proper tracking of the object maintained by the curtain 51.

In the present instance, however, manual means is provided on the camera to operate the curtain in the desired coordination with the movement of the object. This consists of an open sector-shaped frame or pulley segment 66, pivoted at 67 on the right hand end wall of the box near the bottom, and close to the rear side thereof. This sector preferably includes an angle of less than ninety degrees and as shown, includes an angle of approximately seventy degrees. Its curved edge is grooved to receive a part of the cable 65 therein and is at a radius from the pivot sufficient to take up a length of the cord at least equal to the linear movement of the carriage required. The cable 65 is attached to a lug 68 on the forward side of the carriage 55, and extends beside the right hand band 64 to an idler pulley 69 at the end of the top wall of the box, and thence downward to an idler pulley 70 mounted on the end of the box near the rear side, immediately over the sector, and after passing under this pulley and a short distance forward, is connected to the forward part of the sector, so as to pass into the groove of the sector when moved forward. The sector is provided with an operating knob 71 by which it may be rocked on its pivot so as to draw upon the cable 65 and so move the carriage against the opposition of the spring roller 43 of the curtain, this opposition being communicated through the band 64. Opposite movement of the curtain and stadia may be controlled by retarding movement of the sector by the spring roller acting through the bands 64 and cable. Normally, with the curtain retracted to the right and with the stadia carriage at the left limit of its movement, the sector is positioned with one side extending vertically near the rear of the camera while its opposite side extends diagonally forward and upward near the bottom of the camera, as in Fig. 3. All parts of the sector are thus within the vertical rectangle defined by the area of the right end wall of the box. A stop 72 may be fixed on the end of the box to stop return movement to the normal initial position shown in Fig. 3. This will oppose return movement of the curtain 51 beyond the initial or starting position at which the slot 52 will be located a short distance to the right of the opening 18 in the back of the box, and keep the cable 65 and curtain taut and quickly responsive to operation of the knob 71.

In the use of this invention, in case the movement of a land vehicle such as a tank or the like is to be recorded, a course is selected upon which the vehicle is to be run, and this course may have such irregularities or other features as are desired to evidence the answer to question of the functional performance of the vehicle or its parts; and the camera position is selected so that the vehicle may be observed as clearly as possible at all points on the course. While not essential in all cases, it is desirable in most cases—and essential in some—to establish a number of markers, two or more, at or immediately adjacent this course, at a known distance, or distances apart, in order that a linear rate of travel may become apparent in the record made.

The camera is focussed and directed so that the details of an object on any part of the selected course will be effectively imaged at the focal plane and within the boundaries of the film to be exposed. The focussing may be effected by adjustment of the lens, which may include any usual focussing mount. To facilitate observation of the whole picture image on a ground glass screen in the conventional camera back, as well as to broaden or narrow the slot 52 for other purposes, the curtain and camera may embody features common in focal plane shutters, for such purposes, their features not being illustrated here, since they comprise no novel features of my invention, and are well known. The camera being set up and focussed on the desired terrain, the speed of the motor 31 being properly regulated, and a proper diaphragm aperture 40 having been set in the lens by operation of the knob 39, a film holder is inserted in the camera back and the slide drawn and the motor 31 started. The motor and shutter 30 being in operation, the object to be recorded or graphed is now started on its course, and assuming that this movement will occur from left to right across the terrain included in the angle of the lens, the operator will take position behind the camera with one eye applied to the eye piece 57, and the stadia device at the extreme left, so as to gaze through and between the wires 61 of the stadia device toward the point at or just without the left of the included landscape where the moving object will enter the field of view in the camera. At the same time the operator will rest his hand on the knob 71 and be prepared to initiate downward movement of the knob.

As soon as the object is perceived adjacent the line of sight established by the eye when so applied, the operator will apply sufficient force to the knob to operate same and start a movement of the stadia frame in the same general direction as the object, but at slower angular speed than the object.

As the object crosses the first wire 61, the force applied to the knob is increased sufficiently to move the stadia device in synchrony with the object viewed between the wires, and this synchronized movement and registry of the object in the stadia device is maintained throughout all variations of speed of the object while in the field until it passes beyond the predetermined course. This is all that is necessary for the camera operator to do in the course of producing a graph.

As a result of the operation of the sector 66 and stadia-viewer device as described, as long as the moving object or target is kept in the line of sight through the eye piece and stadia wires 61, the movement of the stadia device required to accomplish this "tracking" will cause reverse movement of the curtain slot 52, so that the image of the object will be registered with the slot 52 throughout the recording.

The speed of the shutter should be regulated through the motor so that fresh film will underlie the slot 52 at each full exposure effected by movement of the shutter slot across the lens.

In case an aircraft function is to be recorded the procedure may be the same as before described, but the speed of the shutter may be greater. The time intervals between the full exposures may be a maximum for land vehicles at a considerable distance and may require intervals of ½ second or more for airplanes at 1500 yards.

In the case of projectiles special lighting and background and very high shutter speeds and short exposure intervals are desirable.

In the majority of cases complete detail in the successive full exposures is not essential and complete "stopping" of the image need not be attempted, as some movement during the exposure may be tolerated.

In case the object whose flight is to be recorded moves from right to left along the course to be covered by the operation of the camera, the lens is covered while the knob 71 is fully depressed. The knob is so held while the lens is uncovered and until the object enters the field, when the knob is allowed to rise just fast enough to permit keeping the object in the line of sight by movement of the parts in a direction the reverse of that first described.

While the movement of the stadia device is continued, the shutter 30 is rotated by its motor so as make a succession of full exposures of the object on the portions of the film progressively uncovered by the slot 52 of the curtain 51, so that a mosaic photograph of the whole landscape or other back ground is produced with the course of the object thereacross recorded by full exposure images thereof on the negative resulting from development of the film so exposed. At the same time that the succession of full exposure pictures is obtained, the slots 41 make a continuous under-illuminated image of the entire scene (most of which is intercepted by the curtain) so that a much less dense image of a section of the landscape passes through the slot 52 in between the full exposures effected by the shutter port 35, and on this faint image between the full exposures, there will appear a blurred streak having the vertical dimension of the image of the object in the full exposure, so that its entire intervening course will be shown.

It should be understood that the slots 41 may be omitted in some cases if desired so as to produce only a series of closely spaced pictures of the object, and in others the shutter may be omitted, so as to produce only a graph line, the lens aperture being made proportionate to the expected rate of movement of the object, reflected in a time of exposure of the film under the curtain slot movement. In the first instance a series of vertical strip photographs will be produced, side by side with or without spacing, according to the rate of movement of the curtain in relation to the intervals of operation of the shutter. Other forms of shutter devices may be used if desired to control the time of exposure to afford a maximum speed in proper proportion to the speed of movement of the object so as to effect good "stopping" of the moving object yet not making the exposures at intervals too short or too long.

I claim:

1. In a camera of the character described, a lens, a shutter disc mounted on a plane transverse to the axis of the lens and revoluble on an axis eccentric to the lens and having a substantially continuous concentric slotted portion arranged within but transmitting only a small proportion of the light passing through the lens, said shutter having also an opening of a size to pass a predetermined full proportion of the light passing through the lens, means to operate the shutter at a predetermined speed and frequency, a stationary photosensitive image recording material at the focal plane, a focal plane shutter before the recording material movable horizontally and having a vertical slot therein, said shutter being spring biased to an initial position at one side of the camera and means to move the shutter and to synchronize its movement with the image of the object moving across the field of view.

2. A camera comprising a camera chamber, a photofilm therein, a lens in optical focusing relation to said film, a continuously operating cinematographic shutter adjacent the lens, a transversely movable opaque screen before the film having an aperture therein, a stadia device mounted exteriorly on the camera movable to follow a path parallel to that of the screen, a fixed peep on the camera spaced from the path of the stadia device and arranged to establish a line of sight through the stadia device to an object in the field of the lens, operative connections between the stadia device and the screen constructed to move the screen in a direction opposite that of movement of the stadia device in a ratio such that when the stadia device is in the line of sight from the peep to an object in the field of the lens, the said aperture will be aligned with the image of the object projected by the lens and means to move the stadia device, whereby the stadia device may be moved simultaneously with the aperture of the screen in a relation whereby an object in the line of sight from the peep through said stadia device will have its image projected by the objective through said aperture.

3. The structure of claim 2 in which said screen is a flexible vertically slotted curtain connected to and windable alternately on respective said rollers at opposite sides of the camera, a winding spring operatively connected to one of the rollers tending to keep the curtain wound on said one of the rollers, the rollers including coaxial pulley members exteriorly of the camera, a flexible member connected between the pulleys and alternatively windable thereon and connected to said slide for simultaneous movement of the curtain and slide, and said means to operate the view finder being a manually operated cable draft device movably mounted on the camera, and a flexible operating member extended from said draft device, so as to act in opposition to said spring.

4. The structure of claim 1 in which said slotted portion of the disc consists of a concentric series of short radially narrow curved slots and intervening disc parts, the radial dimension of the slots being equal to only a small fraction of the diameter of the adjacent portion of the effective cone of light from the lens representing the field and said intervening disc parts are also of dimensions each of much smaller dimension circumferentially than the diameter of the said cone where it is intercepted by the shutter said series being located across said cone of light.

5. The structure of claim 2 in which said stadia device includes a track on the top of the camera parallel to the focal plane, a carriage slidable thereon, having an upstanding open frame parallel to said plane and of a width exceeding that of the aperture in the curtain, and vertical parallel stadia wires in said frame spaced to accord with the size of an object to be photographed.

6. The structure of claim 2 in which said stadia device includes a track on the top of the camera device parallel to the focal plane, a carriage slidable thereon, having an upstanding open frame parallel to said plane and of a width exceeding that of the aperture in the curtain, and vertical parallel stadia wires in said frame spaced to accord with the size of an object to be photographed, the side members of said frame being spaced laterally outward of the respective wires and in the same plane.

7. The method of producing a graph of a moving object comprising marking a course for the object, providing a camera having an objective lens, a photosensitive material at the focal plane of the lens, and an apertured opaque screen element movable across the focal plane of the lens; moving the screen element so that the said aperture moves in synchrony with the motion of the object image on the said photosensitive material while maintaining the aperture of the screen and object image in the camera alined, maintaining continuously throughout said focal plane an image of said course with low photometric value, and producing intermittent high photometric value images of segments of the course, each including the approximately stopped image of the said object at successive stages of its movement.

JACOB RABINOW.

REFERENCES CITED

The following references are of record in the file of this patent:

UNITED STATES PATENTS

| Number | Name | Date |
| --- | --- | --- |
| 1,782,860 | Reipert | Nov. 25, 1930 |
| 1,199,980 | Gilbreth | Oct. 3, 1916 |
| 2,279,646 | Smith | Apr. 14, 1942 |
| 1,307,984 | Myers et al. | June 24, 1919 |
| 1,287,146 | Vidler | Dec. 10, 1918 |